United States Patent
DiCarlo

(10) Patent No.: US 8,705,151 B2
(45) Date of Patent: Apr. 22, 2014

(54) IMAGING DEVICE CALIBRATION METHODS, IMAGING DEVICE CALIBRATION INSTRUMENTS, IMAGING DEVICES, AND ARTICLES OF MANUFACTURE

(75) Inventor: Jeffrey M. DiCarlo, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3238 days.

(21) Appl. No.: 10/818,622

(22) Filed: Apr. 5, 2004

(65) Prior Publication Data

US 2005/0219364 A1    Oct. 6, 2005

(51) Int. Cl.
*H04N 1/46* (2006.01)

(52) U.S. Cl.
USPC ............. 358/504; 358/1.1; 358/1.9; 348/188; 348/187

(58) Field of Classification Search
USPC .................. 358/509, 1.1, 1.9, 1.15, 504–505; 348/188, 187, E17.002, 180
See application file for complete search history.

(56) References Cited

U.S. PATENT DOCUMENTS

| | | |
|---|---|---|
| 4,750,148 A | 6/1988 | Sage |
| 5,348,003 A | 9/1994 | Caro |
| 5,355,234 A | 10/1994 | Kim |
| 5,371,690 A | 12/1994 | Engel et al. |
| 5,579,106 A | 11/1996 | Kremer |
| 5,760,829 A | 6/1998 | Sussmeier |
| 6,125,223 A | 9/2000 | Drozdowicz |
| 6,205,244 B1* | 3/2001 | Bawolek et al. ............... 382/162 |
| 6,211,911 B1 | 4/2001 | Komiya et al. |
| 6,363,220 B1 | 3/2002 | Ide |
| 6,538,242 B1 | 3/2003 | Kuno et al. |
| 6,597,451 B1 | 7/2003 | Araki |
| 6,639,574 B2 | 10/2003 | Scheibe |
| 6,655,778 B2 | 12/2003 | Arquilevich et al. |
| 6,759,814 B2 | 7/2004 | Vogel et al. |
| 6,839,088 B2 | 1/2005 | Dicarlo et al. |

(Continued)

FOREIGN PATENT DOCUMENTS

| | | |
|---|---|---|
| EP | 0990881 A | 4/2000 |
| EP | 1349432 A | 10/2003 |

(Continued)

OTHER PUBLICATIONS

"Melles Griot—Glossary"; "Pincushion Distortion"; www.mellesgriot.com/glossary/wordlist/glossarydetails.asp?wID=20188; Jan. 20, 2005; 1 pp.

(Continued)

*Primary Examiner* — King Poon
*Assistant Examiner* — Iriana Cruz

(57) ABSTRACT

Imaging device calibration methods, imaging device calibration instruments, imaging devices, and articles of manufacture are described. According to one embodiment, an imaging device calibration method includes emitting light for use in calibration of an imaging device, providing an emission characteristic of the light, sensing the light using an image sensor of the imaging device, generating sensor data indicative of the sensing using the image sensor, and determining at least one optical characteristic of the imaging device using the generated sensor data and the emission characteristic for use in calibration of the imaging device, and wherein the at least one optical characteristic corresponds to the image device used to sense the light.

4 Claims, 12 Drawing Sheets

(56) References Cited

U.S. PATENT DOCUMENTS

| | | |
|---|---|---|
| 6,864,916 B1 | 3/2005 | Nayar et al. |
| 7,006,690 B1 | 2/2006 | Imura |
| 7,012,634 B2 * | 3/2006 | Vogel et al. .................. 348/187 |
| 7,015,954 B1 | 3/2006 | Foote et al. |
| 7,016,533 B1 | 3/2006 | Bawolek et al. |
| 7,075,643 B2 * | 7/2006 | Holub ........................ 356/326 |
| 7,136,157 B2 | 11/2006 | Gomm et al. |
| 7,154,546 B1 | 12/2006 | Cho |
| 7,158,170 B2 | 1/2007 | Gustavsson et al. |
| 7,236,195 B2 | 6/2007 | Quan et al. |
| 7,245,319 B1 | 7/2007 | Enomoto |
| 7,254,319 B2 | 8/2007 | Bonnin et al. |
| 7,280,147 B2 | 10/2007 | Kitajima et al. |
| 7,286,166 B2 | 10/2007 | Smith et al. |
| 7,372,486 B2 | 5/2008 | Shinohara et al. |
| 2002/0158975 A1 | 10/2002 | Hiroshige et al. |
| 2002/0159066 A1 | 10/2002 | Berstis |
| 2002/0171842 A1 | 11/2002 | Dicarlo et al. |
| 2003/0146663 A1 | 8/2003 | Nelson et al. |
| 2003/0185004 A1 | 10/2003 | Vogel et al. |
| 2003/0214259 A9 | 11/2003 | Dowling et al. |
| 2003/0223007 A1 | 12/2003 | Takane |
| 2004/0081421 A1 | 4/2004 | Mori et al. |
| 2004/0105264 A1 | 6/2004 | Spero |
| 2004/0174433 A1 | 9/2004 | Uchino |
| 2004/0239798 A1 | 12/2004 | Nayar et al. |
| 2005/0036032 A1 | 2/2005 | Lee et al. |
| 2005/0041136 A1 | 2/2005 | Miyata et al. |
| 2005/0219364 A1 | 10/2005 | DiCarlo |

FOREIGN PATENT DOCUMENTS

| | | | | |
|---|---|---|---|---|
| EP | 1349432 A1 * | 10/2003 | ............ | H05B 33/08 |
| JP | 2002-519877 A | 7/2002 | | |
| JP | 2003-331631 A | 11/2003 | | |
| WO | WO-2005/101856 A1 | 10/2005 | | |

OTHER PUBLICATIONS

"Melles Griot—Glossary"; "Barrel Distortion"; www.mellesgriot.com/glossary/wordlist/glossarydetails.asp?wID=102; Jan. 20, 2005; 1 pp.

"About K-Series TV Optoliner Systems"; www.davidsonoptronics.com/tvon002.html; Mar. 26, 2002; 2 pp.

"Imaging Device Analysis Systems and Imaging Device Analysis Methods"; DiCarlo et al.; Feb. 8, 2005.

"Imaging Device Analysis Methods, Imaging Device Analysis Systems, and Articles of Manufacture"; DiCarlo et al.; Feb. 8, 2005 Herewith.

"Imaging Device Analysis Systems and Imaging Device Analysis Methods"; Kholer et al.; Feb. 8, 2005.

"Color Science"; "Concepts and Methods, Quantitative Data and Formulae,"; Wyszecki, G. et al.; John Wiley & Sons, Inc.; 1982; pp. 63-73.

"Cornerstone™ 260 1/4 m Motorized Monochromators"; http://www.newport.com/store/product.aspx?id=5385&Section=detail#; 1996; 1 pp.

International Search Report dated Jun. 22, 2005 (4 pgs).

* cited by examiner

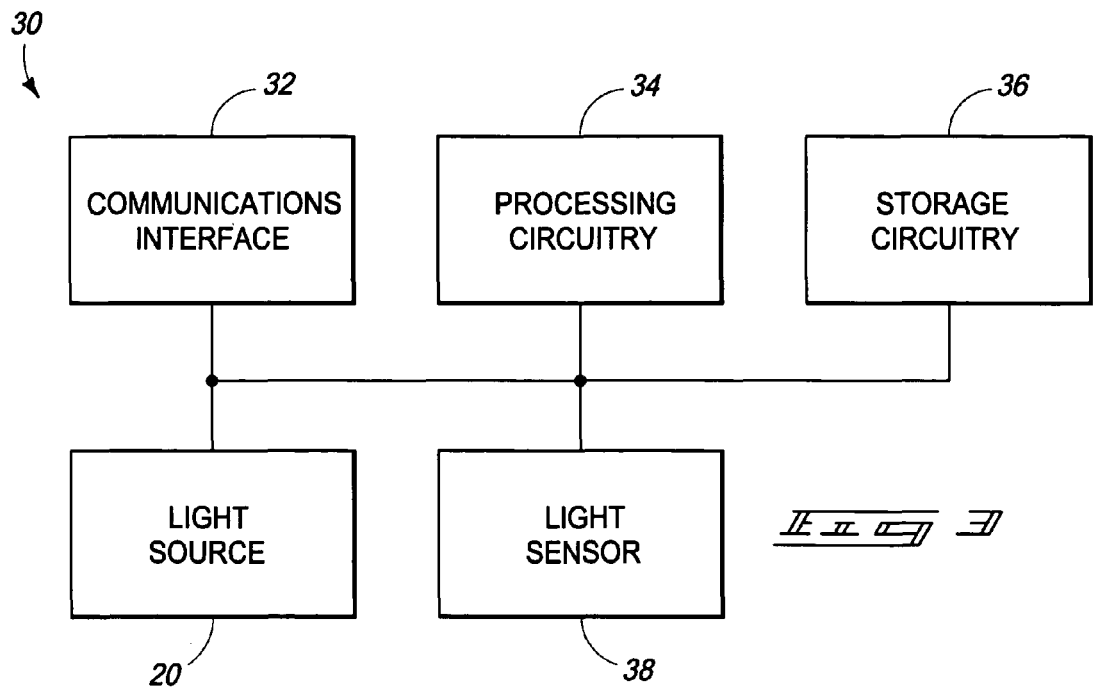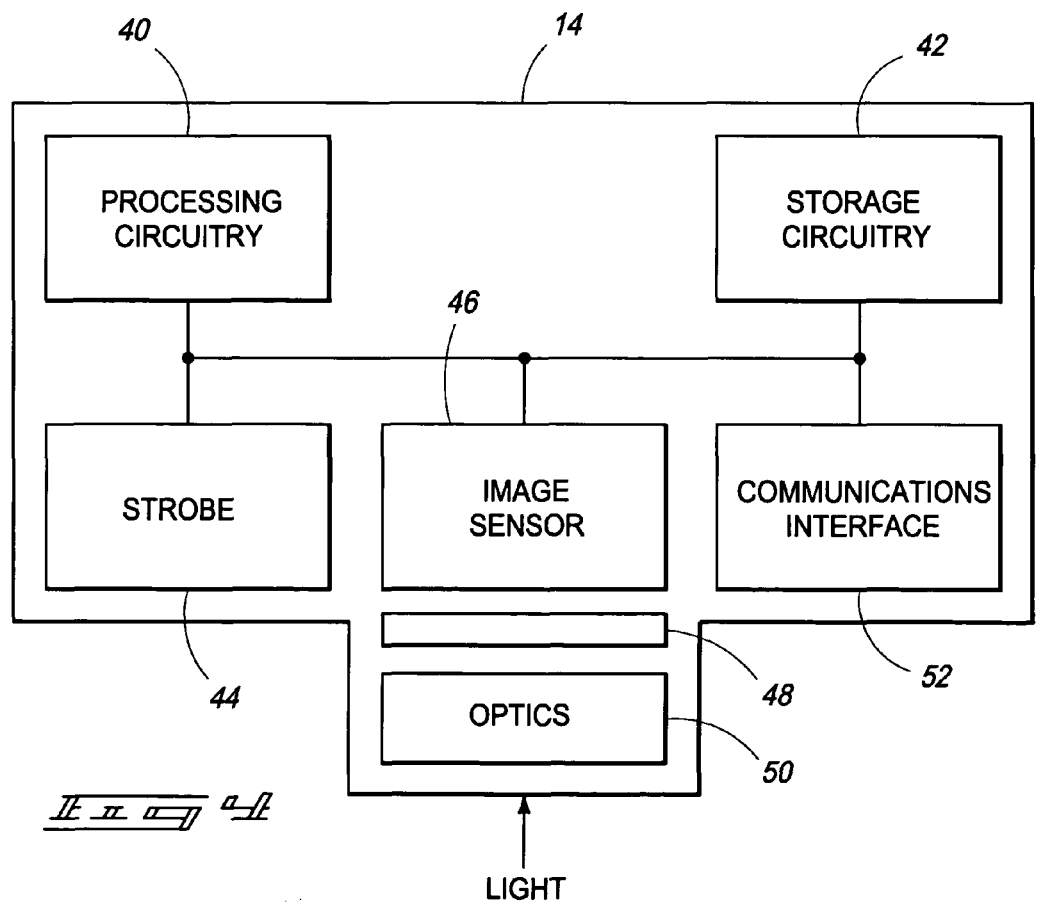

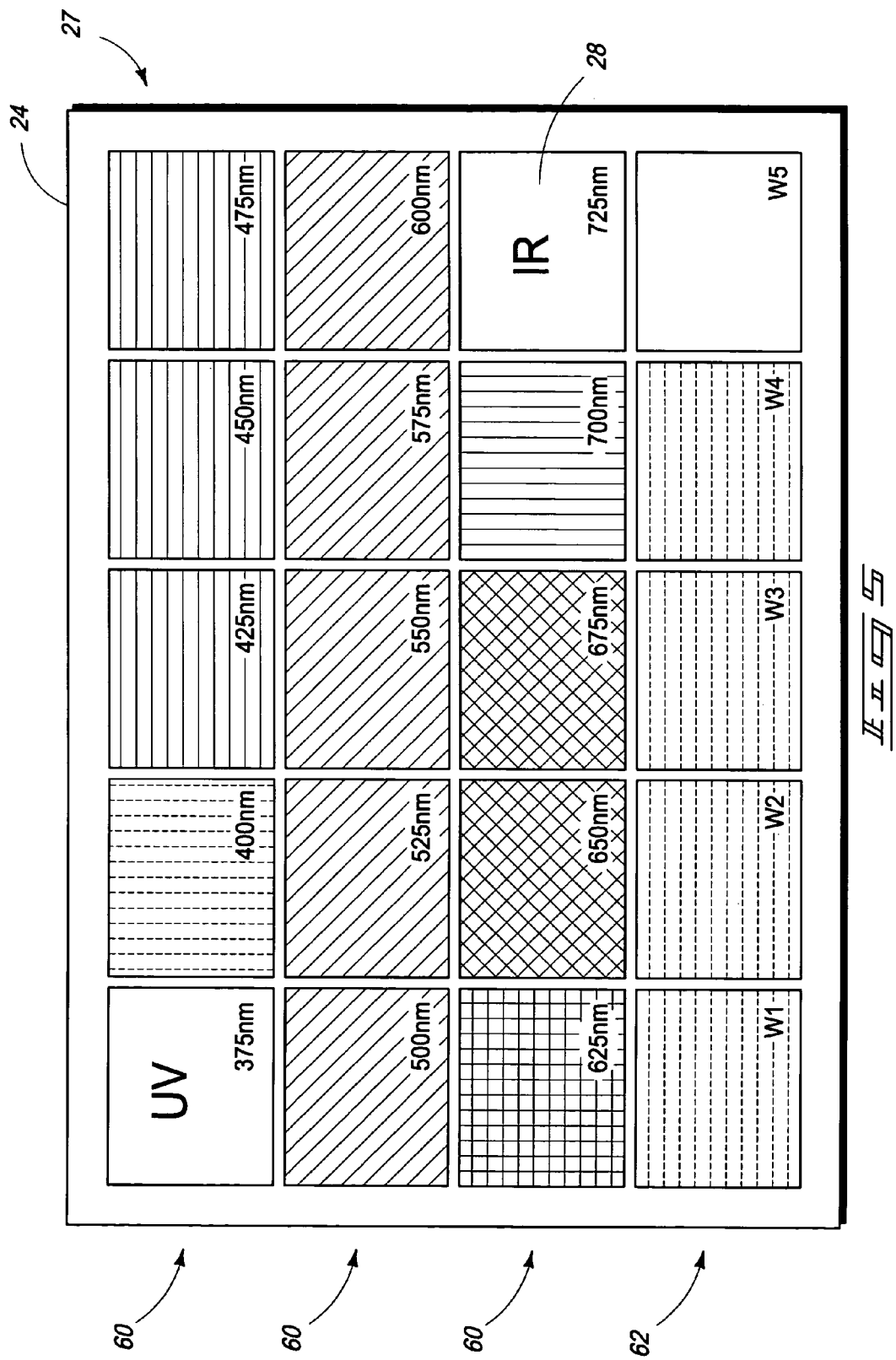

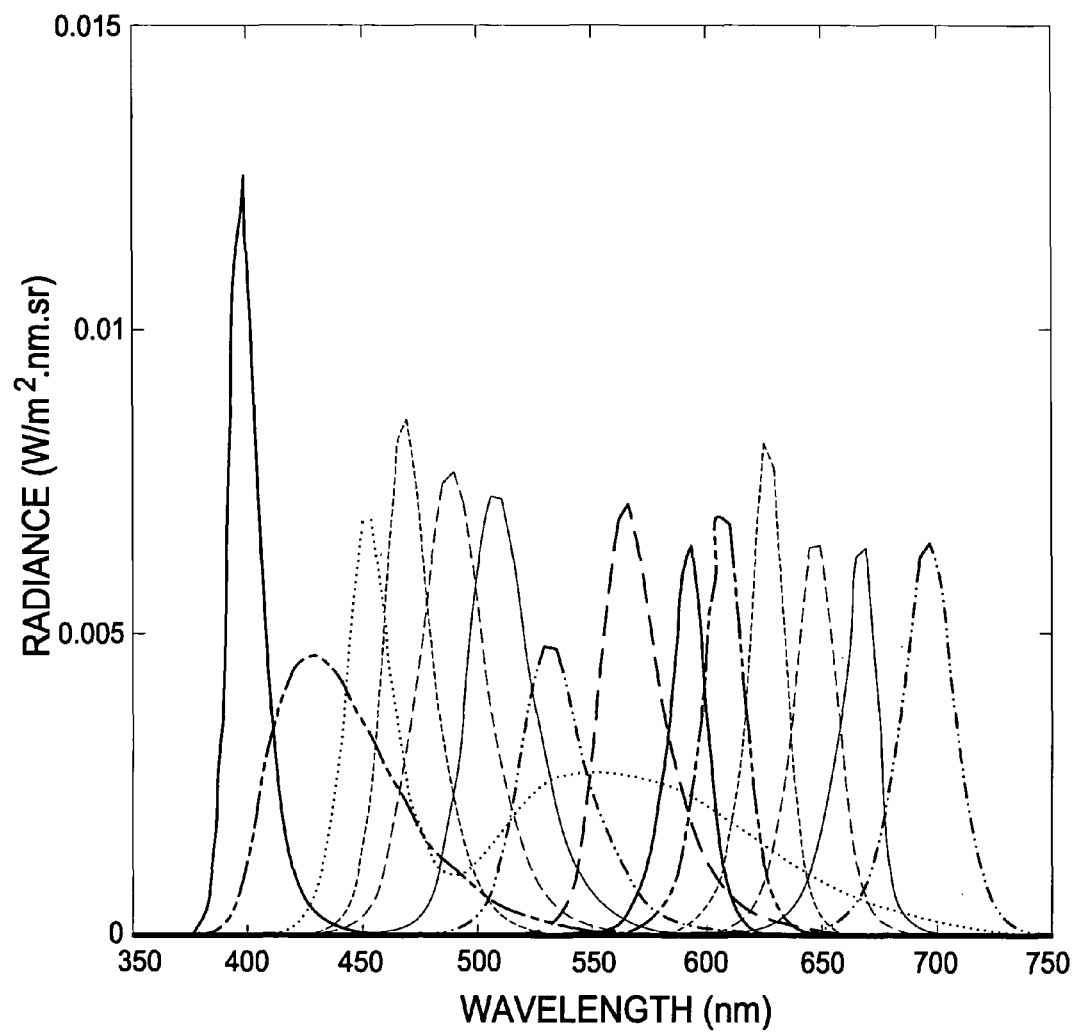

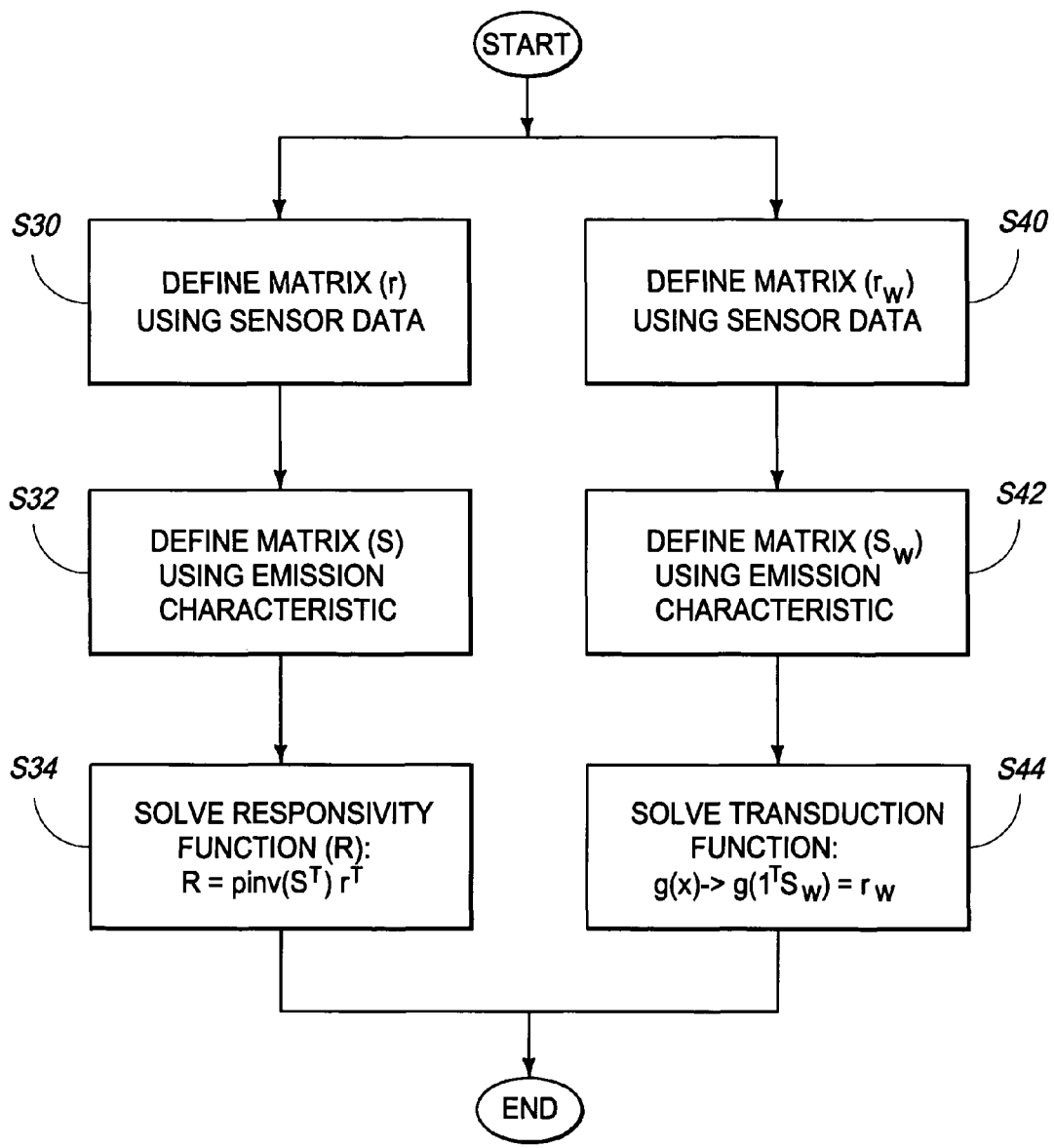

IMAGING DEVICE CALIBRATION METHODS, IMAGING DEVICE CALIBRATION INSTRUMENTS, IMAGING DEVICES, AND ARTICLES OF MANUFACTURE

FIELD OF THE DISCLOSURE

Aspects of the disclosure relate to imaging device calibration methods, imaging device calibration instruments, imaging devices, and articles of manufacture.

BACKGROUND OF THE DISCLOSURE

Imaging systems of various designs have been used extensively for generating images. Exemplary imaging systems include copiers, scanners, cameras, and more recently digital cameras, and other devices capable of generating images. Color imaging systems have also experienced significant improvements and are increasing in popularity. Color imaging systems may be calibrated to increase accuracy of various image processing algorithms (e.g., illuminant estimation, color correction, etc.), and also to increase the color accuracy of final reproductions.

For example, even identically configured imaging systems may vary from one another due to product tolerances or design variances. Referring to FIG. 1, a graphical representation of relative responsivity versus wavelength is shown for two hundred digital cameras corresponding to the same product. FIG. 1 illustrates the variations in blue, green, and red sensor responsivities of the sampled cameras represented by respective bands 4, 6 and 8. The illustrated bands have widths illustrating the size of the variations between respective cameras although the cameras structurally comprise the same components.

One color calibration technique uses reflective charts. Reflective charts can be utilized to calibrate a camera quickly and they are relatively inexpensive. However, calibrations implemented using reflective charts may not be accurate enough for utilization with cameras. Monochromators, on the other hand, can produce very accurate calibrations of color imaging systems including cameras. However, the calibration procedure with monochromators may take a relatively long period of time to complete and the devices are expensive.

At least some aspects of disclosure are related to improved calibration systems and methods.

SUMMARY

According to some aspects, exemplary imaging device calibration methods, imaging device calibration instruments, imaging devices, and articles of manufacture are described.

According to one embodiment, an imaging device calibration method includes emitting light for use in calibration of an imaging device, providing an emission characteristic of the light, sensing the light using an image sensor of the imaging device, generating sensor data indicative of the sensing using the image sensor, and determining at least one optical characteristic of the imaging device using the generated sensor data and the emission characteristic for use in calibration of the imaging device, and wherein the at least one optical characteristic corresponds to the image device used to sense the light.

According to another embodiment, an imaging device calibration instrument comprises a light source configured to emit light having a plurality of different spectral power distributions, an optical interface configured to provide the light to an imaging device to be calibrated using the imaging device calibration instrument, and processing circuitry configured to automatically control the emission of light from the light source to permit the calibration of the imaging device.

Other embodiments are described as is apparent from the following discussion.

DESCRIPTION OF THE DRAWINGS

FIG. 3 is a functional block diagram of circuitry of a calibration instrument according to one embodiment.

FIG. 4 is a functional block diagram of circuitry of an imaging device according to one embodiment.

FIG. 5 is an illustrative representation of an optical interface of a calibration instrument according to one embodiment.

FIG. 6 is a graphical representation of radiance versus wavelength for light emitted from the optical interface according to one embodiment.

FIG. 9 is a flow chart representing exemplary data processing according to one embodiment.

DETAILED DESCRIPTION

At least some aspects of the disclosure provide apparatus and methods which enable fast and accurate calibration of an imaging device. In one embodiment, optical characteristics such as a responsivity function and/or a transduction function of an imaging device may be measured to determine how the associated imaging device responds to input light signals. The determined optical characteristics may be utilized to calibrate the respective imaging device. According to exemplary implementations, emissive light sources as opposed to reflective arrangements are used to determine the optical characteristics and which enable real time fast and relatively inexpensive calibration of an imaging device (e.g., on an assembly line).

Figure 1:
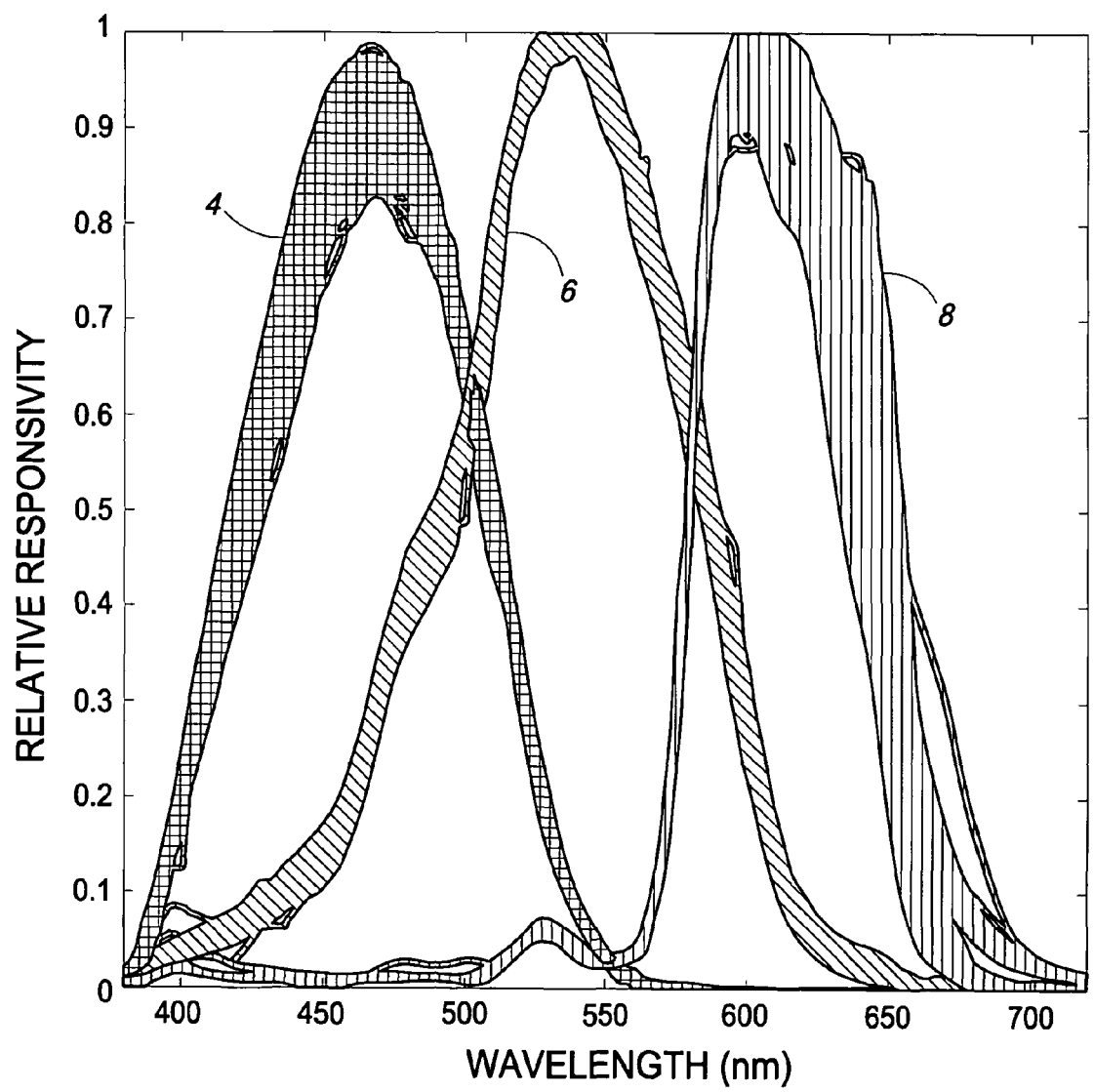
FIG. 1 is a graphical representation of responsivity of a sampling of imaging systems.
Figure 2:
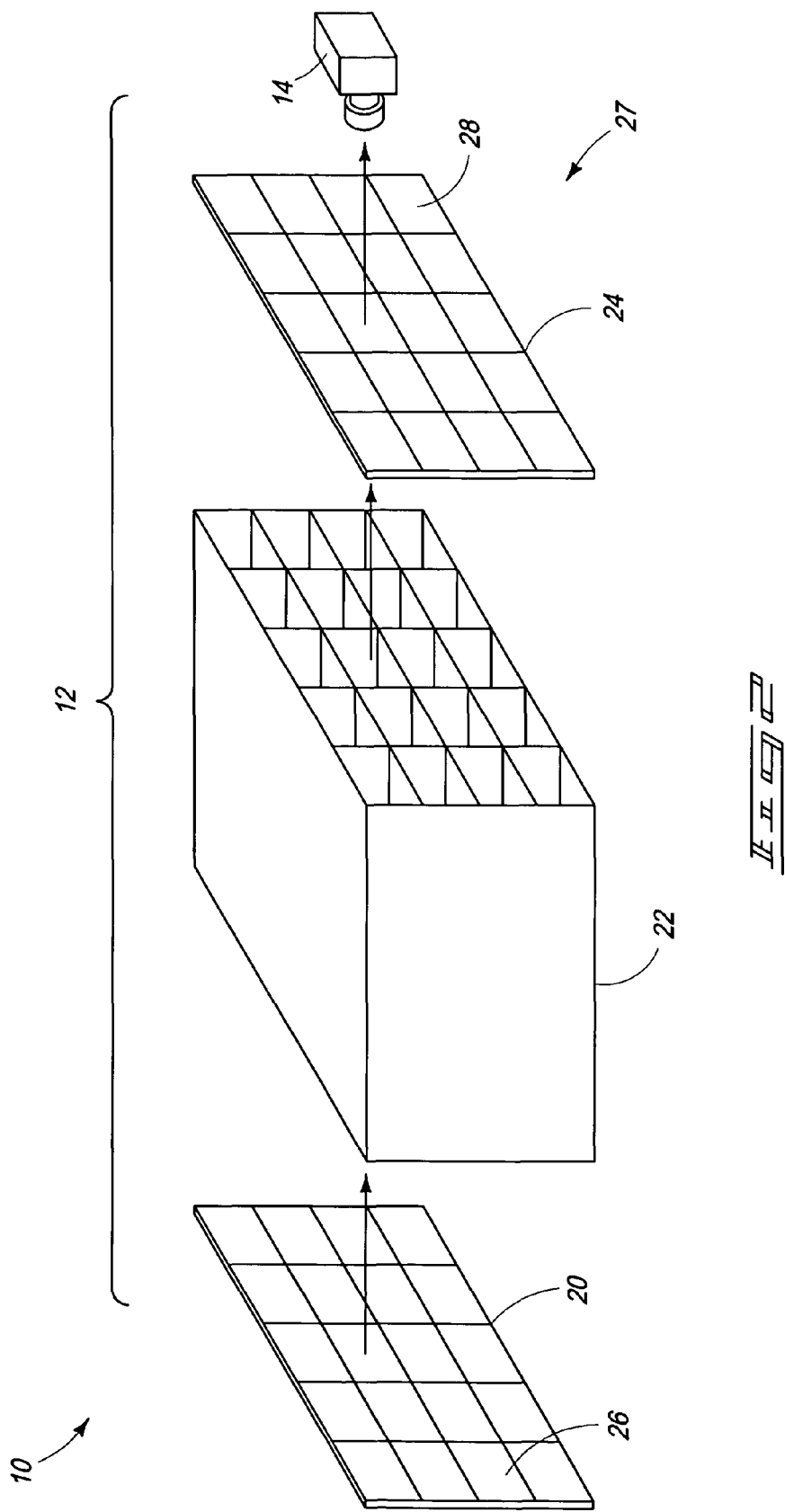
FIG. 2 is an illustrative representation of an exemplary calibration instrument and imaging device according to an illustrative embodiment.

Referring to FIG. 2, an imaging system 10 according to one embodiment is shown. The depicted imaging system 10 includes an exemplary imaging device calibration instrument 12 and an imaging device 14. Instrument 12 may be referred to as an emissive calibration instrument in at least one embodiment wherein one or more light source of the instrument 12 emits light which is used for implementing determination of calibration data and calibration of a device 14.

In at least one embodiment, calibration instrument 12 is used to provide calibration data which may be utilized to calibrate imaging device 14. In at least some embodiments described herein, calibration instrument 12 may operate in conjunction with imaging device 14 to provide the calibration data. Calibration data includes optical characteristics such as responsivity and/or transduction functions of the respective imaging device 14 in exemplary embodiments. The calibration data may be utilized to calibrate the individual respective device 14 used to obtain the calibration data. For example, image processing algorithms of imaging device 14 may be tailored to improve imaging operations thereof including the ability of imaging device 14 to produce pleasing and faithful images of captured scenes.

Imaging device 14 comprises a color digital camera in the illustrated system. Other configurations of imaging device 14 configured to generate image data responsive to received images are possible (e.g., scanner, color copier, color multiple function peripheral, etc.).

Referring again to calibration instrument 12, the depicted exemplary embodiment includes a light source 20, a light randomizer 22, and an optical diffuser 24. For ease of discussion, exemplary components 20, 22, 24 are shown in exploded view. In typical implementations of calibration instrument 12, components 20, 22, 24 are sealed with respect to one another to prevent the introduction of ambient light into instrument 12. Processing circuitry of calibration instrument 12 may also be provided to control calibration operations as is discussed below with respect to the exemplary circuitry of FIG. 3.

Light source 20 may be embodied in different configurations in different embodiments of calibration instrument 12. Further, light source 20 may be controlled in different embodiments to emit different light simultaneously and/or sequentially. Different light comprises light having different emission characteristics, such as different wavelengths, intensities or spectral power distributions.

For example, the depicted configuration of light source 20 comprises a plurality of regions 26 which are individually configured to emit light having different wavelengths and/or intensities compared with other regions 26. Accordingly, the light of at least some of regions 26 may be both spatially and spectrally separated from light of other regions 26 in the embodiment of calibration instrument 12 in FIG. 2. In some embodiments, the light having different wavelengths and/or intensities may be emitted simultaneously. In other embodiments, some of which are described below, light having different wavelengths and/or intensities may be emitted sequentially.

Individual ones of the regions 26 may comprise one or more light emitting device (not shown). Exemplary light emitting devices include narrow-band devices which provide increased accuracy compared with broad-band reflective patches. Light emitting devices of regions 26 include light emitting diodes (LEDs) and lasers in exemplary embodiments. Other configurations of light emitting devices of regions 26 may be utilized. In one example, individual regions 26 comprise a 3×3 square of light emitting devices configured to emit light of the same wavelength and intensity.

In the depicted exemplary embodiment, light randomizer 22 comprises a plurality of hollow tubes corresponding to respective ones of regions 26 of light source 20. Light randomizer 22 is configured to present substantially uniform light for individual ones of regions 26 to diffuser 24 in the described configuration. Internal surfaces of the tubes of light randomizer may have a relatively bright white matte surface. Other configurations of light randomizer 22 are possible. For example, light randomizer 22 may comprise a single hollow tube in at least one other embodiment of instrument 12 having a single light emitting region described below.

Optical diffuser 24 comprises an optical interface 27 configured to present substantially uniform light for individual ones of regions 26 (and respective regions 28 of optical interface 27 discussed below) to imaging device 14 for use in calibration operations. Other configurations of optical interface 27 apart from the illustrated optical diffuser 24 may be utilized to output light to imaging device 14. An exemplary optical diffuser 24 comprises a translucent acrylic member. The illustrated exemplary optical diffuser 24 is configured to output light corresponding to light emitted by light source 20. For example, the exemplary depicted optical interface 27 comprises a plurality of regions 28 corresponding to respective regions 26 of light source 20. In other embodiments, more or less regions 28 may be provided corresponding to the provided number of regions 26 of light source 20. In at least one embodiment, optical randomizer 22 and diffuser 24 provide different light corresponding to respective ones of regions 28 and for individual ones of the regions 28, the respective light is substantially uniform throughout the area of the respective region 28. In other possible implementations, another optical diffuser may be implemented intermediate light source 20 and light randomizer 22 or within light randomizer 22.

In one embodiment, light randomizer 22 comprises plural aluminum substantially square tubes corresponding to regions 26 of light source 20. The tubes may individually have a length of 2.5 inches between source 20 and interface 27 and square dimensions of 1 inch by 1 inch. The interior surfaces of the tubes may be coated with a white coating such as OP.DI.MA material having part number ODMO1-FO1 available from Gigahertz-Optik. Diffuser 24 may comprise a plurality of pieces of white translucent acrylic material having part number 020-4 available from Cyro Industries with dimensions of 1 inch by 1 inch comprising individual ones of regions 28 and individually having a thickness of ⅛ inch. Other configurations or embodiments are possible.

Referring to FIG. 3, exemplary circuitry 30 of calibration instrument 12 is shown. The depicted circuitry 30 includes a communications interface 32, processing circuitry 34, storage circuitry 36, light source 20 and a light sensor 38. More, less or alternative circuit components may be provided in other embodiments.

Communications interface 32 is configured to establish communications of calibration instrument 12 with respect to external devices. Exemplary configurations of communications interface 32 include a USB port, serial or parallel connection, IR interface, wireless interface, or any other arrangement capable of uni or bi-directional communications. Any appropriate data may be communicated using communications interface 32. For example, as described below, communications interface 32 may be utilized to communicate one or more emission characteristic of light source 20 and/or one or more determined optical characteristics of the respective imaging device 14 to be calibrated.

In one embodiment, processing circuitry 34 may comprise circuitry configured to implement desired programming. For example, processing circuitry 34 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 34 are for illustration and other configurations are possible.

Processing circuitry 34 may be utilized to control operations of calibration instrument 12. In one embodiment, processing circuitry 34 is configured to automatically control the timing of emission of light from the instrument 12 (e.g., control the timing to simultaneously and/or sequentially emit light having different wavelengths and/or intensities from instrument 12). In one embodiment, processing circuitry 34 may automatically control the timing and the emission of the light without user intervention.

Storage circuitry 36 is configured to store electronic data and/or programming such as executable instructions (e.g., software and/or firmware), calibration data, or other digital information and may include processor-usable media. In addition to the calibration data described above, additional exemplary calibration data may include one or more emission characteristics of light emitted using optical interface 27 of calibration instrument 12. As discussed below, exemplary emission characteristics include spectral power distributions (SPDs) of light emitted at optical interface 27 according to one embodiment. Spectral power distributions include emission characteristics including wavelengths of the emitted light and associated intensities of the light for the respective wavelengths of light.

Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Light source 20 may be configured in exemplary arrangements as described above. For example, light source 20 may be configured to emit light of different wavelengths and/or intensities in one embodiment. The different wavelengths and/or intensities may be defined by a plurality of regions 26 as described above. In another embodiment, light source 20 is configured to emit light of a substantially constant wavelength and/or intensity and a plurality of spatially separated filters positioned downstream of light source 20 and corresponding to regions 26 may be utilized to provide light of any different desired wavelengths and/or intensities. In another embodiment described below, light source 20 may be configured to sequentially emit different light using a single region. Other arrangements are possible.

Light sensor 38 is optically coupled with light source 20 and is configured to receive emitted light therefrom. In one example, light sensor 38 is implemented as a photodiode although other configurations are possible. One or more light sensor 38 may be positioned within light randomizer 24 in some embodiments (e.g., one light sensor 38 may be positioned in light randomizer 22 implemented as a single hollow tube in one exemplary configuration described herein). In other arrangements having plural regions 26, light sensor 38 may be optically coupled via an appropriate light pipe (not shown) or other configuration with the regions 26 and corresponding to emitted light having different wavelengths and/or intensities.

Light sensor 38 is configured to monitor emitted light for calibration purposes of calibration instrument 12 in one arrangement. For example, at least some configurations of light source 20 may provide light which drifts in wavelength and/or intensity over time. Light sensor 38 may be utilized to monitor the light and indicate to a user that instrument 12 is out of calibration and service is desired. For example, calibration instrument 12 may be considered to be out of calibration if intensities of different wavelengths of light vary with respect to one another. Exemplary recalibration of calibration instrument 12 may include re-determining the emission characteristics (e.g., spectral power distributions) of light emitted from the optical interface 27.

Referring to FIG. 4, imaging device 14 is illustrated in an exemplary configuration as a digital camera. As mentioned previously, imaging device 14 may be embodied in other configurations to generate images from scenes or received light. Imaging device in the illustrated configuration includes processing circuitry 40, storage circuitry 42, a strobe 44, an image sensor 46, a filter 48, optics 50, and a communications interface 52.

In one embodiment, processing circuitry 40 may be embodied similar to processing circuitry 34 described above and comprise circuitry configured to implement desired programming. Other exemplary embodiments of processing circuitry include different and/or alternative hardware to control operations of imaging device 14 (e.g., control strobe 44, optics 50, data acquisition and storage, processing of image data, communications with external devices, and any other desired operations). These examples of processing circuitry 40 are for illustration and other configurations are possible.

Storage circuitry 42 is configured to store electronic data (e.g., image data) and/or programming such as executable instructions (e.g., software and/or firmware), or other digital information and may include processor-usable media similar to the above-described storage circuitry 36 in at least one embodiment.

Strobe 44 comprises a light source configured to provide light for usage in imaging of operations. Processing circuitry 40 controls operation of strobe 44 in the described embodiment. Strobe 44 may be disabled, utilized alone or in conjunction with other external sources of light (not shown).

Image sensor 46 is configured to provide raw image data of a plurality of raw images. The raw image data comprises digital data corresponding to a plurality of pixels of the raw images formed by image sensor 46. For example, the raw images comprise bytes corresponding to the colors of red, green and blue at respective pixels in an exemplary RGB application. Other embodiments may utilize or provide other color information. Image sensor 46 may comprise a plurality of photosensitive elements, such as photodiodes, corresponding to the pixels and configured to provide the raw digital data usable for generating images. For example, image sensor 46 may comprise a raster of photosensitive elements (also referred to as pixel elements) arranged in 1600 columns by 1280 rows in one possible configuration. Other raster configurations are possible. Photosensitive elements may individually comprise charge coupled devices (CCDs) or CMOS devices in exemplary configurations. In one specific example, image sensor 46 may utilize X3 technology in sensor arrangements available from Foveon, Inc.

Filter 48 is provided upstream of image sensor 46 to implement any desired filtering of light received by imaging device 14 prior to sensing by image sensor 46. For example, in one embodiment, filter 48 may remove infrared light received by imaging device 14.

Optics 50 includes appropriate lens and an aperture configured to focus and direct received light for creation of images using image sensor 46. Appropriate motors (not shown) may be controlled by processing circuitry 40 to implement desired manipulation of optics 50 in one embodiment.

Communications interface 52 is configured to establish communications of imaging device 14 with respect to external devices (e.g., calibration instrument 12). Exemplary configurations of communications interface 52 include a USB port, serial or parallel connection, IR interface, wireless interface, or any other arrangement capable of uni or bi-directional communications. Communications interface 52 may be configured to couple with and exchange any appropriate data with communications interface 32 of calibration instrument 12 or other external device. For example, communications interface 52 may be utilized to receive one or more emission characteristic of light source 20 and/or one or more determined optical characteristic of the respective imaging device 14. Further, interface 52 may output sensor data generated by image sensor 46 and which may be used to implement image processing operations including determination of optical characteristics of imaging device 14 as described below.

Referring to FIG. 5, an exemplary configuration of optical interface 27 is shown. The depicted optical interface 27 corresponds to the embodiment of calibration instrument 12 shown in FIG. 2 and includes a plurality of regions 28 of different light having different wavelengths and/or intensities.

In the illustrated configuration, optical interface 27 includes plural rows 60 of colored regions and a single row 62 of white regions. More, less or regions of other wavelengths and/or intensities may be provided in other embodiments of optical interface 27.

Colored region rows 60 provide plural regions 28 of light having different wavelengths. For example, in the depicted embodiment, rows 60 include regions 28 sequentially increasing in wavelength at increments of 25 nm from ultraviolet light (375 nm) to infrared light (725 nm) providing light which is spectrally and spatially separated. In the illustrated example, row 62 comprises a plurality of regions W1-W5 of the same relative spectral power distribution and which increase in intensity. The relative intensity of the white patches may be 0.01, 0.03, 0.10, 0.30, and 1 for respective ones of regions W1-W5.

According to the exemplary embodiment of FIG. 5, the number of light emitting devices and/or the drive currents for the light emitting devices may be varied between respective regions 28 to provide the desired spectral power distributions of emitted light. Other configurations are possible in other embodiments.

In one embodiment, the regions 28 of FIG. 5 may be numbered 1 to 15 sequentially from left to right for each of the rows starting with the top row and continuing to the bottom row. Exemplary light emitting devices may comprise LEDs available from Roither Lasertechnik and have the following part numbers for the respective regions 28: (1) 380D30, (5) HUBG-5102L, (13) ELD-670-534, (14) ELD-700-534, and (15) ELD-720-534. Remaining exemplary light emitting devices may comprise LEDs available from American Opto and have the following part numbers for the respective regions 28: (2) L513SUV, (3) L513SBC-430NM, (4) L513NBC, (6) L513NBGC, (7) L513NPGC, (8) L513UGC, (9) L513NYC-E, (10) L513UOC, (11) L513NEC, (12) L513TURC, and (W1-W5) L513NWC.

In this example, the drive currents may be constant for the light emitting devices of all of the regions 28 for rows 60 (e.g., 18-20 mA) and the number of light emitting devices per region 28 are varied according to: (1) 4, (2) 1, (3) 14, (4) 2, (5) 4, (6) 3, (7) 1, (8) 27, (9) 3, (10) 2, (11) 1, (12) 2, (13) 2, (14) 2, and (15) 1. The number of light emitting devices for individual ones of the regions 28 of row 62 may be the same (e.g., four) and the following exemplary drive currents may be used: 0.2, 0.6, 2, 6 and 20 mA for respective ones W1-W5 of region 28. The above example is for illustration and other configurations or variations are possible.

As described further below, utilization of optical interface 27 shown in FIG. 5 including regions 28 of varying wavelength and/or intensity enables simultaneous determination of responsivity and transduction functions of imaging device 14, for example, via a single exposure of the device 14 to light emitted from optical interface 27 using imaging device 14. Other configurations of optical interface 27 are possible as discussed herein (e.g., providing an optical interface wherein only wavelength or intensity are varied between regions 26, providing an optical interface with only a single emission region for sequentially emitting light of the same wavelength and/or intensity, etc.).

Provision of light of different wavelengths by calibration instrument 12 may be utilized to determine a responsivity function of imaging device 14. In the embodiment of optical interface 27 illustrated in FIG. 5, plural regions 26 of rows 60 may simultaneously emit light for determination of the responsivity function via a single exposure thereto by imaging device 14 due to the spatially and spectrally separated regions 26 of rows 60.

Referring to FIG. 6, the emission of light via optical interface 27 (i.e., and received by imaging device 14) may be optimized to facilitate determination of the responsivity function of the imaging device 14 being calibrated. The graphical representation of FIG. 6 illustrates spectral power distributions of light emitted by light source 20 and provided at regions 28 of optical interface 27 which facilitate the responsivity analysis of imaging device 14. The spectral power distributions include exemplary radiance values for the regions 28 of optical interface 27 depicted in FIG. 5 increasing in wavelength from left to right along the x-axis.

As mentioned above, the number of light emitting devices of source 20 may be varied for individual regions 26 to provide different intensities. In another embodiment, the number of light emitting devices may be the same for individual regions 26 and the drive currents of the light emitting devices of the respective regions 26 may be varied to provide desired intensities. Other arrangements may be used to provide desired spectral power distributions. In one embodiment, the intensities may be selected to approximate the exemplary spectral power distributions depicted in FIG. 6 during calibration of instrument 12 itself. Once the appropriate drive currents of the light emitting devices of respective regions 26 (or other configuration parameters) are determined, instrument 12 may be calibrated to drive the light emitting devices using the determined drive currents or parameters. In one embodiment, the light emitting devices of a respective region 26 may be driven using the same drive current while drive currents used to drive light emission devices of different regions 26 may be different. Other configurations apart from varying the number of light emitting devices and/or drive currents for respective regions 26 may be used in other embodiments as mentioned above.

Further, the spectral power distribution of light emitted at optical interface 27 using the drive currents may be determined following calibration of instrument 12. In one example, the spectral power distribution of light emitted at optical interface 27 may be measured using a spectral radiometer. The measured spectral power distribution of calibration instrument 12 may be stored as an emission characteristic of calibration instrument 12 using storage circuitry 36 or other appropriate circuitry and subsequently utilized during calibration operations of one or more imaging device 14. New drive currents and/or spectral power distributions may be determined during recalibration of instrument 12.

Emission characteristics may also be provided and stored for individual regions 28 of row 62. As mentioned previously, at least some of the regions 28 may be configured to vary intensity of light for a given wavelength of light (e.g., the regions of row 62). Data regarding the intensities of light corresponding to regions 28 may be stored as an emission characteristic for subsequent usage in calibration of one or more imaging device 14. The intensity data may also be extracted from the spectral power distributions of light from regions 28 within row 62.

Figure 7:
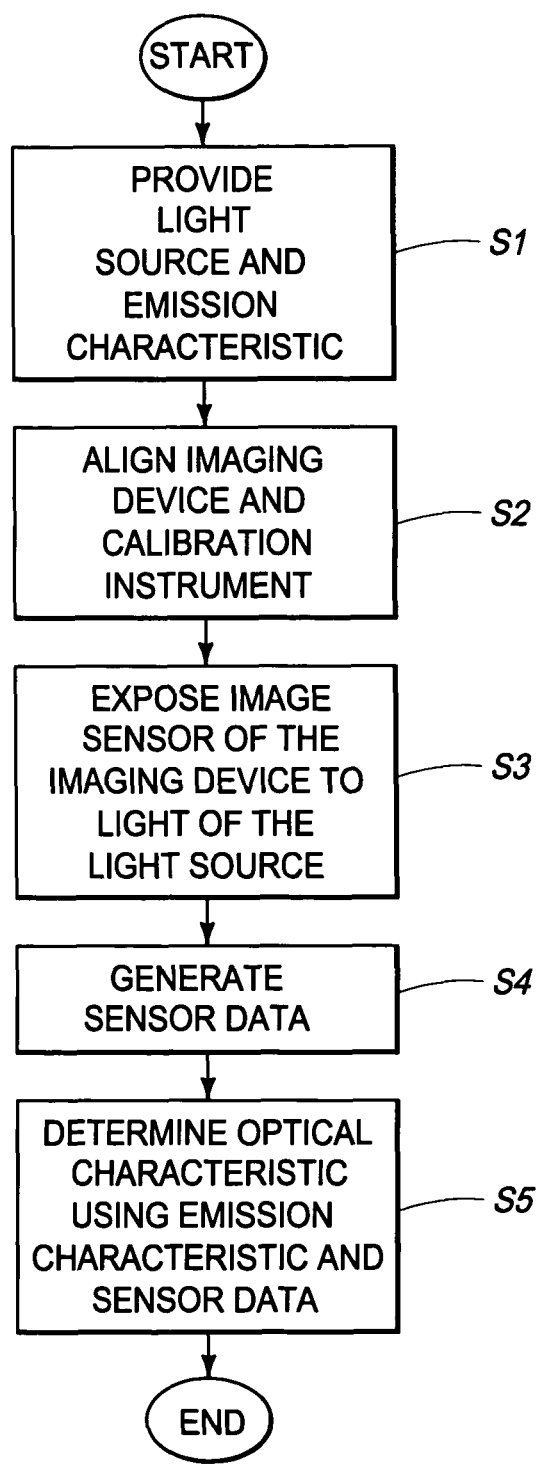
FIG. 7 is a flow chart representing an exemplary imaging device calibration method according to one embodiment.

Referring to FIG. 7, an exemplary method for implementing calibration of an imaging device 14 using calibration instrument 12 is shown. Other methods are possible including more, less or alternative steps.

At a step S1, an embodiment of calibration instrument 12 having a light source is provided along with at least one emission characteristic of light emitted from the light source.

At a step S2, the imaging device 14 to be calibrated is aligned with calibration instrument 12.

At a step S3, image sensor 46 of imaging device 14 is exposed to light emitted from the light source.

At a step S4, image sensor 46 senses the light and generates sensor data which is indicative of the sensing by the image sensor 46.

At a step S5, appropriate processing circuitry determines an optical characteristic of imaging device 14 using the emission characteristic and the sensor data. The optical characteristic may be utilized to calibrate imaging device 14. The exemplary method of FIG. 7 may be repeated for other imaging devices 14.

Figures 8A, 8B:
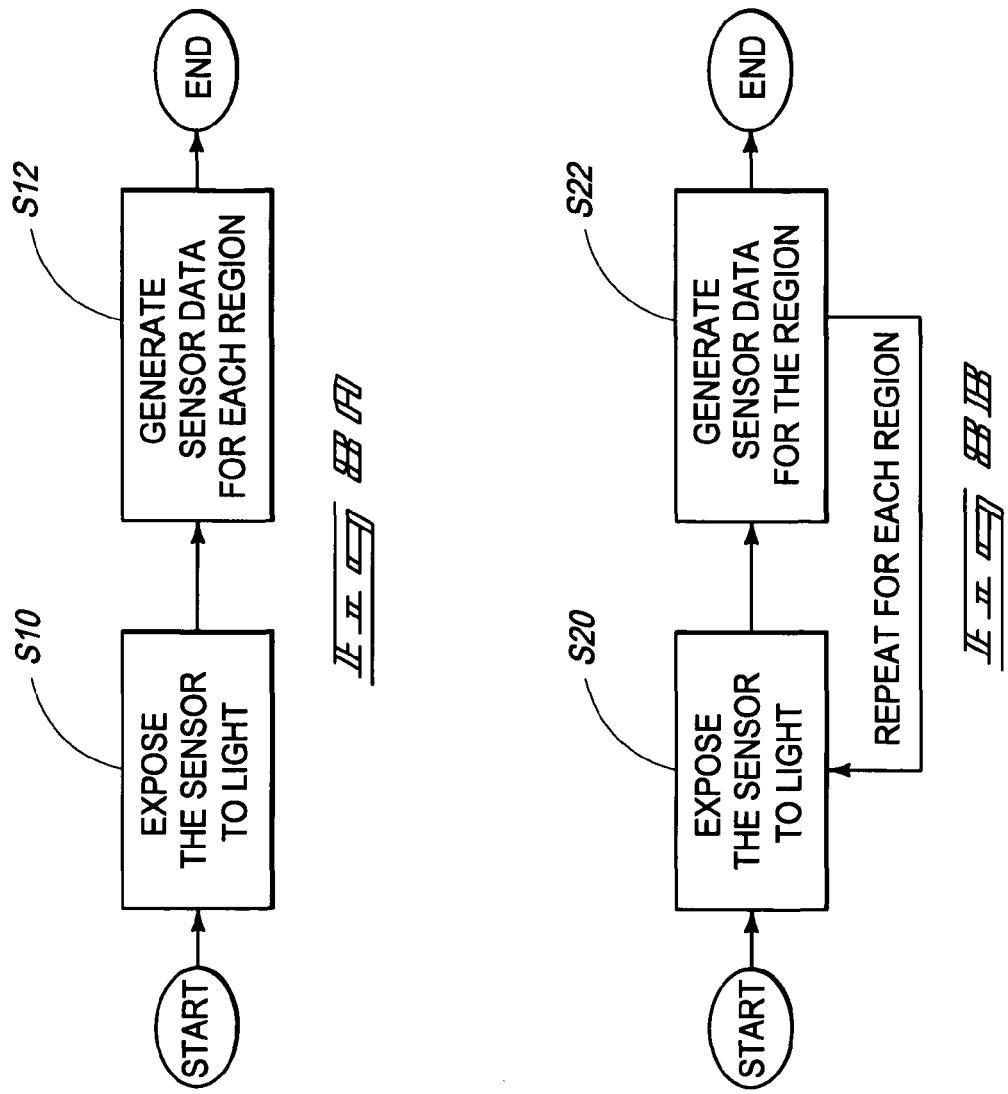
FIG. 8a is a flow chart representing exemplary data acquisition according to one embodiment.
FIG. 8b is a flow chart representing exemplary data acquisition according to another embodiment.

Referring to FIG. 8*a*, a flow chart illustrates an exemplary method for data acquisition during calibration of an associated imaging device 14 using the calibration instrument 12 described with reference to FIG. 2.

At a step S10, the imaging device to be calibrated is brought into alignment to receive light emitted from the optical interface of the calibration instrument 12. Once aligned, the light source 20 of calibration instrument 12 is controlled to emit light at regions 28 of optical interface 27. Imaging device 14 is configured to provide the optical interface 27 into focus and to expose the image sensor 46 to light from calibration instrument 12 (e.g., takes a photograph) to receive the light emitted from optical interface 27.

At a step S12, sensor data is generated by image sensor 46 responsive to the exposing in step S10. In one embodiment, individual pixels of image sensor 46 are configured to provide sensor data comprising RGB values. Pixel locations of image sensor 46 may correspond to regions 28 of optical interface 27. Accordingly, a plurality of pixels of image sensor 46 may be identified which correspond to individual ones of regions 28. RGB values from individual ones of the pixels which correspond to respective individual regions 28 and may be averaged using processing circuitry 34, 40 or other desired circuitry in one embodiment to provide a single averaged RGB value for each of regions 28. According to one embodiment, the sensor data comprising averaged RGB values may be utilized for calibration of imaging device 14 as described below.

Data acquisition operations are described below with respect to another embodiment of calibration instrument 12. Calibration instrument 12 according to the other presently described embodiment includes an optical interface having a single region (not shown) to output light for calibration of imaging device 14. For example, as opposed to arranging light emitting devices of different wavelengths and/or intensities according to regions 26 as described above, light emitting devices of the light source having different wavelengths or intensities may be distributed around an entirety of the area of the region of the optical interface.

In one embodiment, it is desired for the light emitting devices of the light source to provide a substantially uniform distribution of light across an entirety of the area of the region of the optical interface. In one possible implementation, individual ones of the light emitting devices comprising twenty different wavelengths or intensities may be positioned adjacent to one another in sequence in both rows and columns to provide a substantially uniform emission of light across the region of the optical interface for individual ones of the wavelengths on intensities. Other patterns of distribution of the light emitting devices are possible.

In one operational embodiment, only the light emitting devices of a common wavelength or intensity may be controlled to emit light at any given moment in time. According to this embodiment, the light emitting devices of a first wavelength of light may be controlled to emit respective light substantially uniform across the area of the region. Thereafter, the light emitting devices for the remaining wavelengths may be sequentially individually controlled to emit light of the respective wavelengths in sequence providing temporal and spectral separation of the emitted light. If present, light emitting devices having different intensities for a given wavelength may thereafter be individually configured to emit light in sequence to enable transduction calibration operations described further below. Accordingly, in one embodiment, the light emitting devices of respective wavelengths or intensities may be sequentially configured to emit respective light. More specifically, light emitting devices having a common wavelength may be sequentially controlled to individually emit light starting at 375 nm and progressing to 725 nm and followed by the emission of light from light emitting devices configured to provide light of a common wavelength and varied intensity from W1 to W5. Imaging device 14 may sense emitted light for each of the respective emitted wavelengths 375 nm-725 nm and intensities W1-W5 of light in one embodiment. Sensor data is then provided by imaging device 14 for each of the wavelengths and intensities of light.

Referring to FIG. 8*b*, exemplary data acquisition operations according to the second above-described embodiment having an optical interface 27 with a single region providing sequentially emitted different light are described.

At a step S20, the calibration instrument is controlled to emit light having a single wavelength. The image sensor of the imaging device to be calibrated is exposed to the emitted light.

At a step S22, an average RGB value for the respective wavelength may be determined from pixel sensor data of the image sensor using processing circuitry 34, 40 or other desired circuitry.

Thereafter, the processing may return to step S20 whereupon the instrument controls the emission of light of the next wavelength enabling generation of sensor data for the respective wavelength using the imaging device 14. The process of FIG. 8*b* may be repeated to provide sensor data comprising averaged RGB values in the described embodiment for as many different wavelengths or intensities of light emitted using the calibration instrument.

The above-described embodiments are provided to illustrate exemplary data acquisition techniques for implementing imaging device calibration operations. Other data acquisition methods and/or apparatus may be used in the other embodiments.

Referring to FIG. 9, the acquired data is processed following acquisition to determine calibration data of the imaging device 14. Exemplary processing includes determining calibration data comprising optical characteristics (e.g., responsivity and/or transduction functions) for the respective imaging device 14 according to one embodiment. As mentioned above, processing circuitry 34, 40 and/or other appropriate processing circuitry may perform data acquisition operations. Similarly, processing circuitry 34, 40 and/or other appropriate processing circuitry may be utilized to process the acquired data for example as shown in FIG. 9. Further, data acquisition and processing may be performed by the same or different processing circuitry.

In the illustrated exemplary processing of FIG. 9, optical characteristics including responsivity and transduction functions of the imaging device 14 are determined. In other embodiments, only one of responsivity or transduction functions, and/or alternative characteristics of the imaging device 14 are determined. Further, additional optical characteristics or other information for use in calibration of imaging device 14 may be determined. For example, responsivity and/or transduction functions may be further processed by appropriate processing circuitry 34, 40 or other processing circuitry (not shown). For example, a color correction matrix, an illuminant estimation matrix and/or other information may be derived from the responsivity and transduction functions.

Steps S30-S34 illustrate exemplary processing for determining a responsivity function of imaging device 14.

Steps S40-S44 illustrate exemplary processing for determining a transduction function of imaging device 14. Other processing may be utilized according to other arrangements (not shown).

At step S30, the sensor data obtained from image sensor 46 including the averaged RGB values described above for the respective individual regions 28 of rows 60 in the described embodiment may define a matrix r.

At step S32, the emission characteristic comprising spectral power distributions (SPDs) of the regions 28 in the described embodiment may define a matrix S.

At step S34, the responsivity function R may be determined using matrices r, S and the equation $R=\text{pinv}(S^T)r^T$ in the described example.

The transduction function may be determined in parallel with the determination of the responsivity function in the illustrated example.

Referring to step S40, the sensor data from image sensor 46 including the averaged RGB values for the respective individual regions 28 of row 62 in the described embodiment may define a matrix $r_w$.

At step S42, the emission characteristic comprising spectral power distributions of the regions 28 in the described embodiment may define a matrix $S_w$.

At step S44, the transduction function $g(x) \rightarrow g(1^T S_w) = r_w$ may be solved using matrices $r_w$, $S_w$ in the described example.

The above-described methods of FIG. 9 may be used to determine one or more optical characteristic for respective individual ones of the imaging devices 14 which provided the respective sensor data indicative of the circuitry of the respective imaging devices 14, and accordingly, the above-described processes may be performed for individual ones of imaging devices 14 to be calibrated to determine the respective appropriate one or more optical characteristic for the respective devices 14. The above-described methods of FIG. 9 are exemplary and other processing or methods may be utilized to determine responsivity and/or transduction functions or other optical characteristics of imaging device 14 in other embodiments.

Once determined, the optical characteristics may be used to calibrate the respective imaging devices 14. For example, optical characteristics comprising responsivity and transductance functions may be used to increase the accuracy of image processing algorithms (e.g., illuminant estimation and color correction) of respective imaging devices 14, and also to increase the color accuracy of final reproductions.

As described herein in one embodiment, the exemplary apparatus and/or methods may be used to determine whether components of imaging device 14 are defective (e.g., sensor 46, filter 48, etc.). For example, the ability of the respective imaging devices 14 to remove infrared or other light may also be monitored using calibration instruments 12 discussed above and configured to emit infrared or other light. For example, a filter of imaging device 14 and configured to remove certain light (e.g., infrared) may be identified as defective if the sensor data generated by the respective imaging device 14 responsive to light emitted from optical interface 27 of calibration instrument 12 (and including infrared or other desired light) indicates that the received light included emitted infrared or the other light which was not removed by filter 48.

In one embodiment, the determined optical characteristics may be communicated to respective imaging devices 14 which implement appropriate calibration if the optical characteristics were determined using processing circuitry 34 of calibration instrument 12 (or other processing circuitry external of imaging devices 14). Alternately, processing circuitry 40 of imaging devices 14 may determine the optical characteristics of the respective devices 14. In another embodiment, the calibration may be performed externally of imaging devices 14 using the determined optical characteristics and the calibrated image processing algorithms may be subsequently provided to the respective imaging devices 14. In yet another embodiment, processing circuitry 40 of imaging devices 14 may be configured to utilize the determined (e.g., internally or externally) optical characteristics to implement the calibration internally of the imaging devices 14. In sum, any appropriate processing circuitry may be configured to generate one or more optical characteristic for the respective imaging devices 14 and the same or other processing circuitry may utilize the one or more optical characteristic to implement the calibration.

Figure 10:
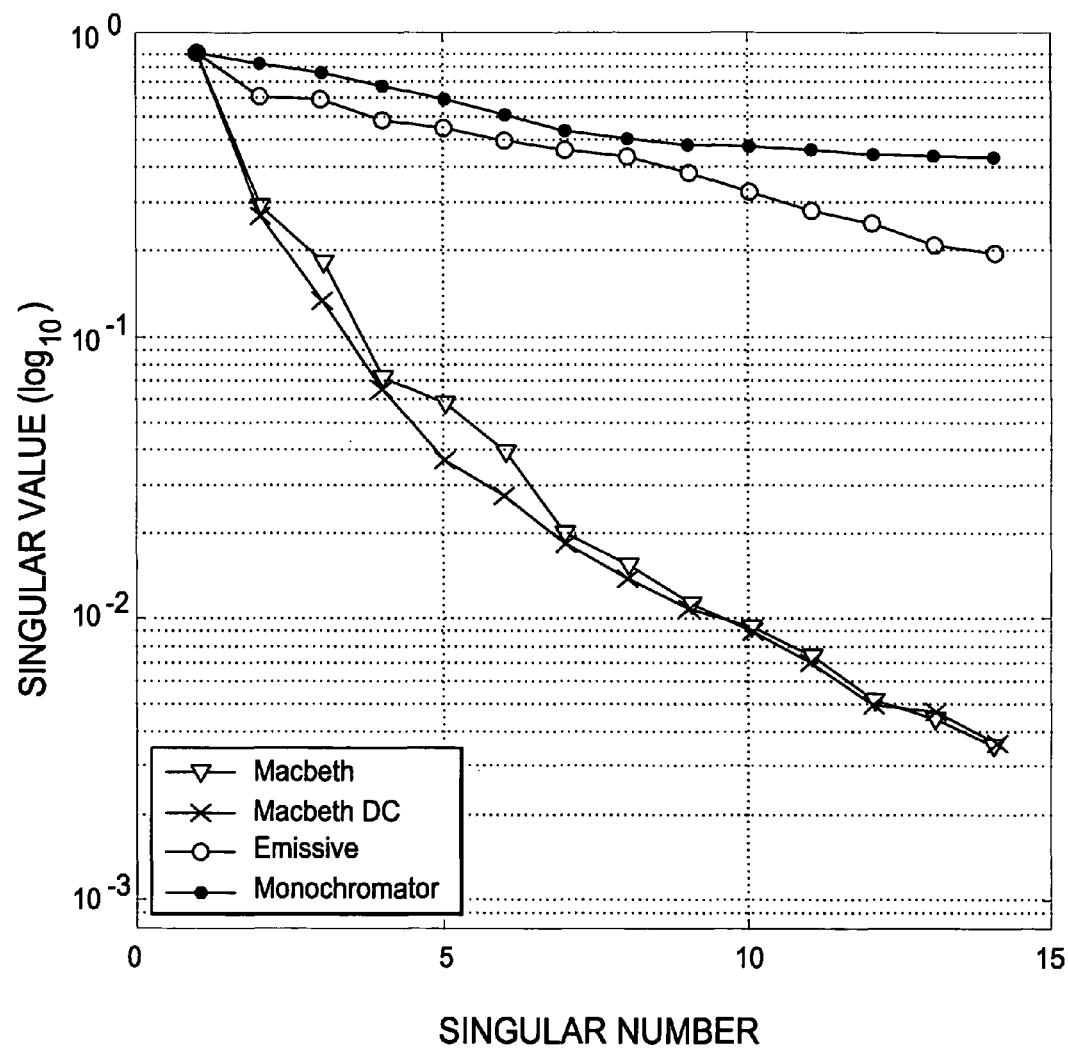
FIG. 10 is a graphical representation comparing exemplary calibration techniques.

Referring to FIG. 10, a graphical representation is shown of singular value decomposition of different calibration methods including exemplary emissive aspects described herein compared with usage of reflective patches (Macbeth and Macbeth DC) and a monochromator.

The relatively high and constant singular value decomposition using the exemplary emissive calibration instrument 12 of FIG. 2 and described herein is similar to results achieved with a monochromator and greatly exceed the results achieved through the Macbeth and Macbeth DC reflective patches wherein the respective curves are not constant and have relatively rapidly decreasing slopes. The accuracy of the calibration methods depends on how spectrally correlated the reflective patches or the light emitting devices are to each other. More correlated patches or light emitting devices produce less accurate calibrations. This is the case because calibration techniques invert an image formation equation to compute the camera responsivity functions. When spectrally correlated patches or light emitting devices are inverted, noisy estimates of the camera responsivity functions result. The singular values of the reflectance functions of patches or the spectral power distributions of light emitting devices indicate the accuracy of a given method. The more singular values which are greater than 0.01 (anything less may be considered too noisy), the more accurate the method (see e.g., FIG. 10). Basically, the number of singular values indicates the number of patch colors or light emitting devices that contribute to the resulting calibration.

Figure 11:
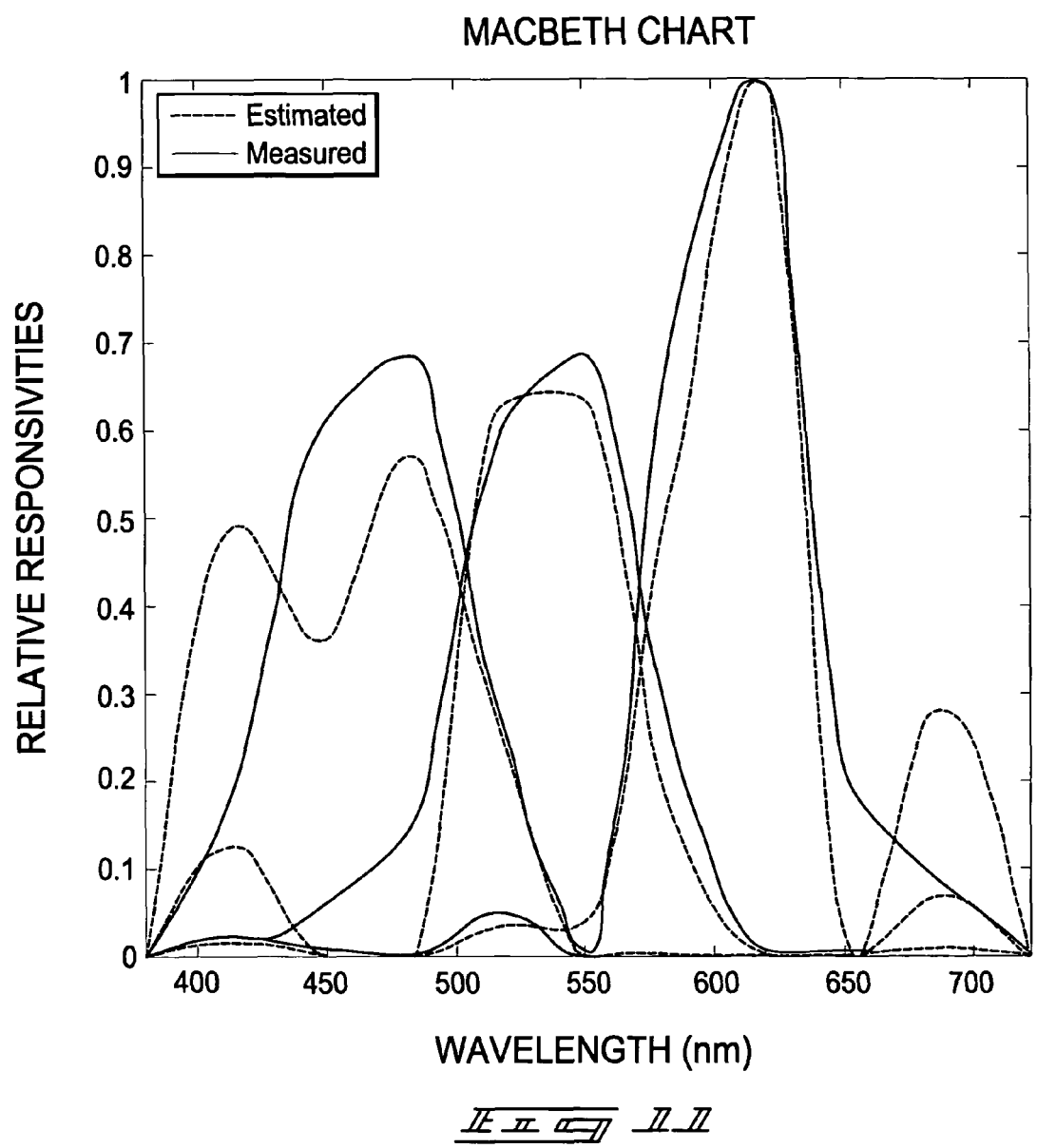
FIG. 11 is a graphical representation comparing estimated and measured relative responsivities using a Macbeth chart calibration technique.
Figure 12:
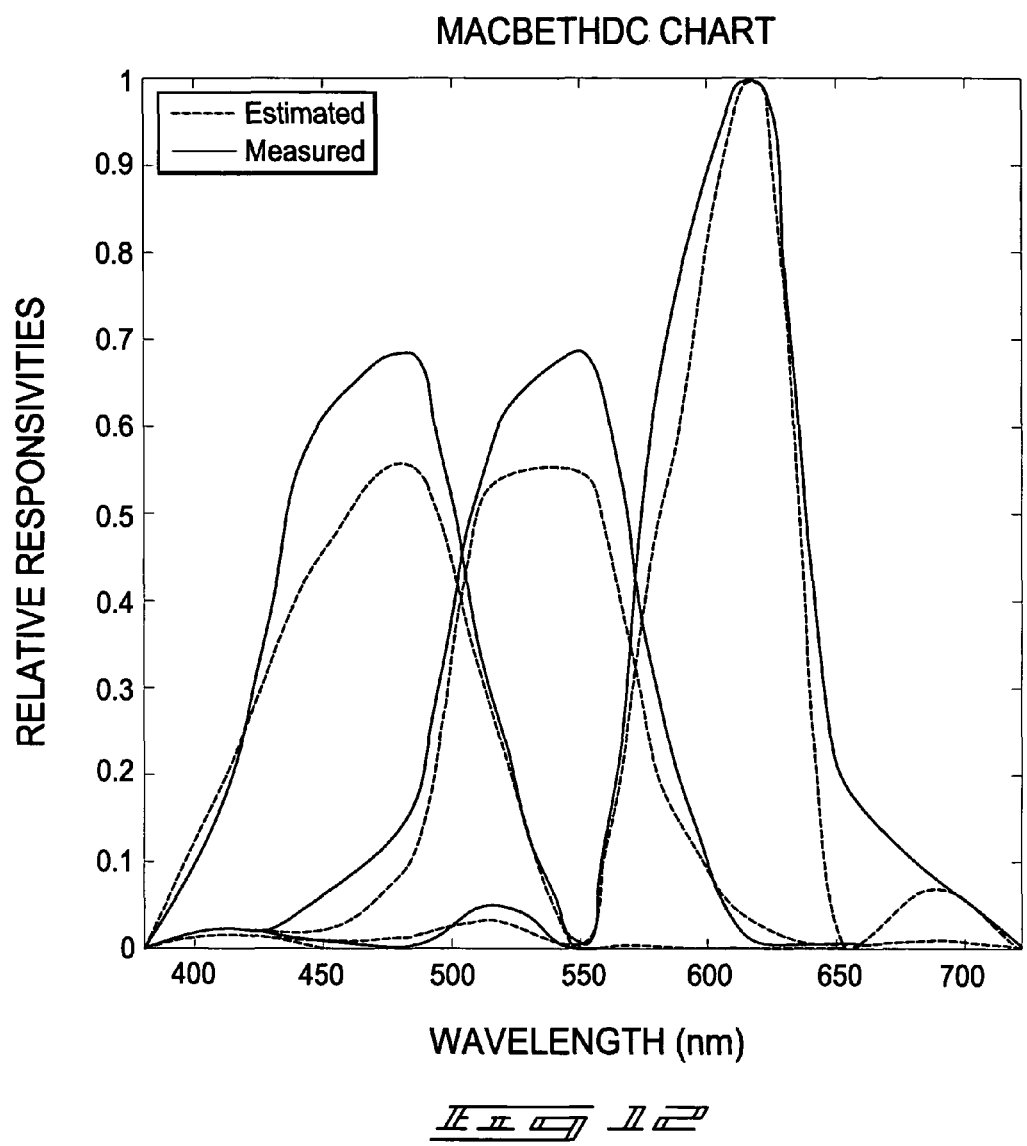
FIG. 12 is a graphical representation comparing estimated and measured relative responsivities using a MacbethDC chart calibration technique.
Figure 13:
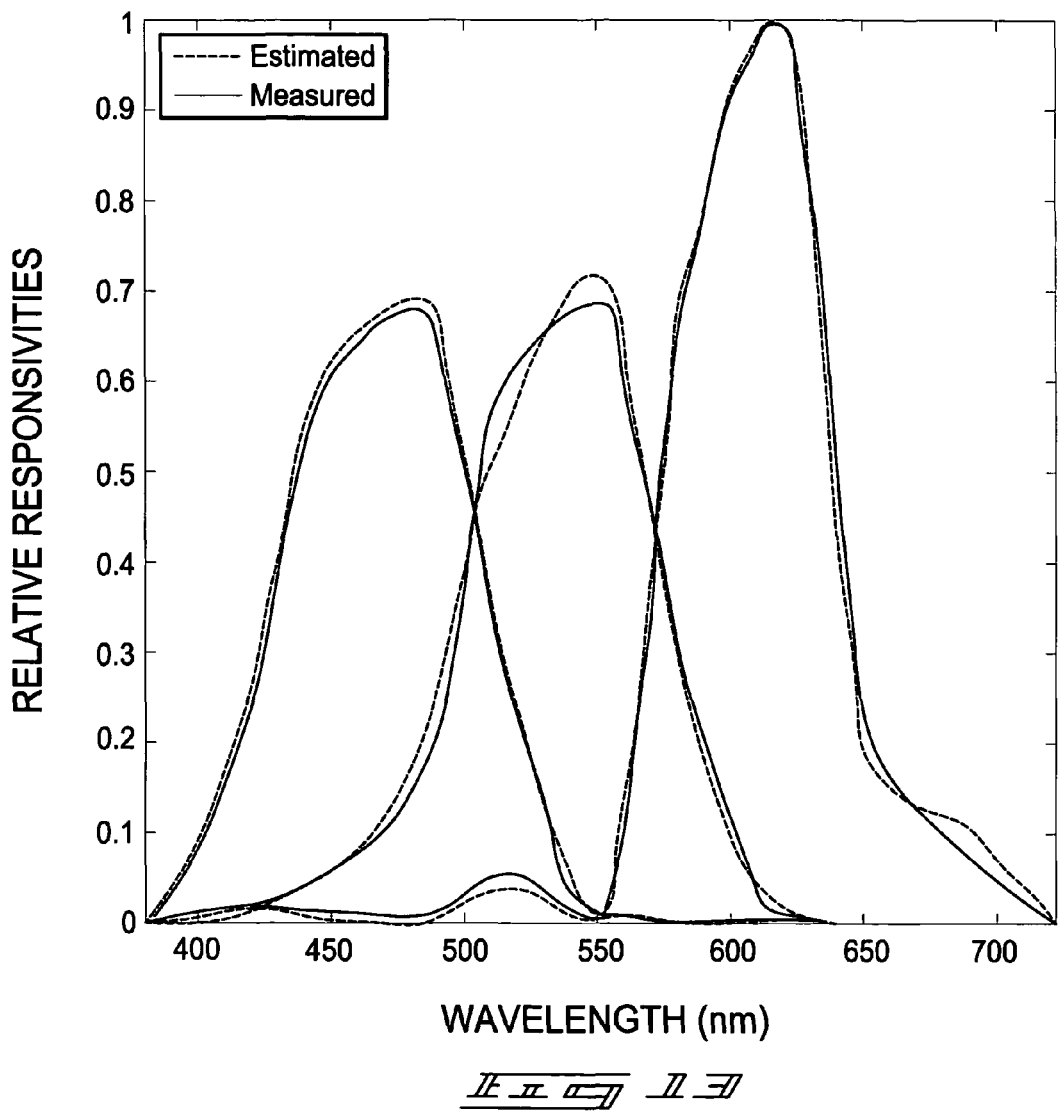
FIG. 13 is a graphical representation comparing estimated and measured relative responsivities using an emissive calibration instrument according to one embodiment.

Further, with respect to FIGS. 11-13, exemplary relative responsivities determined using Macbeth reflective patches (FIG. 11), MacbethDC reflective patches (FIG. 12) and the exemplary emissive calibration instrument 12 of FIG. 2 (FIG. 13) for a D1 digital camera available from Nikon are individually shown with respect to graphs measured using a monochromator. It is clear from a comparison of FIGS. 11-13 that the calibration instrument 12 of FIG. 2 provides increased accuracy of determining relative responsivities of a given imaging device 14 compared with usage of reflective patches (e.g., Macbeth and MacbethDC).

Table 1 compares the calibration procedures using reflective charts, the calibration instrument 12 of FIG. 2 and a monochromator. The calibration instrument 12 of FIG. 2 provides the shortest calibration time for a given imaging device 14 (i.e., slightly shorter than the reflective chart) and no uniformity of an external light source is required as with the reflective chart, and hours shorter than a monochromator (i.e., colors may be measured spatially in the configuration of FIG. 2 instead of temporally as with the monochromator). Calibration instrument 12 has the shortest calibration time of the compared devices since external sources of light do not have to be made uniform (e.g., the exemplary instrument 12 emits desired light itself).

TABLE 1

| Reflective chart | Calibration Instrument | Monochromator |
| --- | --- | --- |
| 1. Uniformly illuminate the chart using an ambient source.<br>2. Take a photograph of the chart<br>3. Run software to calibrate. | 1. Turn on the device.<br>2. Take a photograph of the device.<br>3. Run software to calibrate | 1. Set monochromator to a specified wavelength and bandwidth.<br>2. Take a photograph of the light exiting the monochromator.<br>3. Measure the power level of the light exiting the monochromator.<br>4. Repeat steps 1-3 for each wavelength of the visible spectrum.<br>5. Run software to calibrate. |

Table 2 compares approximate cost of devices configured to implement the above-described three calibration methods.

TABLE 2

| Reflective chart | Calibration Instrument | Monochromator |
| --- | --- | --- |
| $50-$350 (retail) | $200-$400 (est. retail) | $5,000-$20,000 (retail) |

Table 3 compares the number of singular values of the three methods and devices including the calibration instrument of FIG. 12. Other embodiments of calibration instrument 12 may include more or less wavelengths and/or intensities of light as desired. For example, embodiments of instrument 12 described above include twenty types of different light. In other embodiments, any appropriate number of different types of light (wavelength and/or intensity) may be used sequentially, in plural regions, or according to other appropriate schemes.

TABLE 3

| Reflective chart | Calibration Instrument | Monochromator |
| --- | --- | --- |
| approximately 4 | 15-20 (depends on number of emissive sources) | >50 |

Reflective charts because they have broadband, highly-correlated patch colors, only contribute approximately 4 measurements that can be used for calibration. This is typically not adequate for calibrations of imaging devices 14 comprising cameras. The monochromator, on the other hand, produces over 50 calibration measurements because it typically uses narrow-band sources. Hence, the monochromator produces calibration results of increased accuracy, but the calibration time is relatively long and the cost is relatively expensive. The exemplary calibration instrument 12 of FIG. 2 has an associated 15-20 measurements, for example, which produces more than adequate calibration results for typical imaging devices 14 (e.g., digital cameras), but it does not suffer the cost and long calibration times of the monochromator or utilize external illumination as used with reflective patches.

Accordingly, at least some aspects of the disclosure allow for quick, accurate, and relatively inexpensive determination and calibrations of responsivity and transduction functions of imaging devices 14 and may be utilized to calibrate imaging devices on the manufacturing line in at least one implementation. As discussed above, imaging devices 14 of the same model or using the same type of components may have different responsivity and transduction functions due to sensor and/or color filter manufacturing variations. Calibration instruments 12 described herein may be used for determining optical characteristics of the devices 14 and calibrating the devices 14 before the imaging devices 14 are shipped to a customer or dealer. The relatively quick and accurate calibrations may improve the overall color reproduction quality of individually calibrated imaging devices 14.

Calibration instruments 12 or methods discussed herein may also be used by professional or prosumer photographers for calibration of high-end imaging devices 14. It is believed that such calibrations would improve the overall color reproduction quality of the resulting images generated by such calibrated imaging devices 14. At least some such calibration aspects may be focused to a more professional market inasmuch as some calibration aspects utilize raw image data from the imaging device 14 and typically, raw image data is provided by imaging devices 14 developed for these markets.

The protection sought is not to be limited to the disclosed embodiments, which are given by way of example only, but instead is to be limited only by the scope of the appended claims.

What is claimed is:

1. An imaging device calibration method comprising: emitting light for use in calibration of an imaging device; providing an emission characteristic of the light; sensing the light using an image sensor of the imaging device; generating sensor data indicative of the sensing using the image sensor; and determining at least one optical characteristic of the imaging device using the generated sensor data and the emission characteristic for use in calibration of the imaging device, and wherein the at least one optical characteristic corresponds to the image device used to sense the light, wherein the determining comprises determining the at least one optical characteristic comprising responsivity.

2. An imaging device calibration method comprising: emitting light for use in calibration of an imaging device; providing an emission characteristic of the light; sensing the light using an image sensor of the imaging device; generating sensor data indicative of the sensing using the image sensor; and determining at least one optical characteristic of the imaging device using the generated sensor data and the emission characteristic for use in calibration of the imaging device, and wherein the at least one optical characteristic corresponds to the image device used to sense the light, wherein the determining comprises determining the at least one optical characteristic comprising transduction.

3. An imaging device calibration method comprising: emitting light for use in calibration of an imaging device; providing an emission characteristic of the light; sensing the light using an image sensor of the imaging device; generating sensor data indicative of the sensing using the image sensor; and determining at least one optical characteristic of the imaging device using the generated sensor data and the emission characteristic for use in calibration of the imaging device, and wherein the at least one optical characteristic corresponds to the image device used to sense the light, wherein the determining comprises determining the at least one optical characteristic comprising information derived from at least one of a responsivity function and a transduction function.

4. An imaging device calibration method comprising: emitting light for use in calibration of an imaging device; providing an emission characteristic of the light; sensing the light using an image sensor of the imaging device; generating sensor data indicative of the sensing using the image sensor; and determining at least one optical characteristic of the imaging device using the generated sensor data and the emission characteristic for use in calibration of the imaging device, and wherein the at least one optical characteristic corresponds to the image device used to sense the light, wherein the emitting the light comprises simultaneously emitting different light using a plurality of light emitting devices, and the determining comprises determining the at least one optical characteristic comprising responsivity and transduction using the simultaneously emitted light.

* * * * *